US011292385B2

(12) United States Patent
Betz et al.

(10) Patent No.: US 11,292,385 B2
(45) Date of Patent: Apr. 5, 2022

(54) METHOD FOR FEEDBACK OF A TEMPERATURE SETTING

(71) Applicant: DAIMLER AG, Stuttgart (DE)

(72) Inventors: Daniel Betz, Rottenburg-Seebronn (DE); Florian Etter, Esslingen (DE); Daniel Fuhrmann, Böblingen (DE); Daniel Steffen Setz, Böblingen (DE)

(73) Assignee: DAIMLER AG, Stuttgart (DE)

( * ) Notice: Subject to any disclaimer, the term of this patent is extended or adjusted under 35 U.S.C. 154(b) by 400 days.

(21) Appl. No.: 16/098,590

(22) PCT Filed: Apr. 10, 2017

(86) PCT No.: PCT/EP2017/000452
§ 371 (c)(1),
(2) Date: Nov. 2, 2018

(87) PCT Pub. No.: WO2017/190826
PCT Pub. Date: Nov. 9, 2017

(65) Prior Publication Data
US 2019/0118614 A1 Apr. 25, 2019

(30) Foreign Application Priority Data
May 3, 2016 (DE) .......................... 102016005460.3

(51) Int. Cl.
*B60Q 3/20* (2017.01)
*B60Q 3/80* (2017.01)
(Continued)

(52) U.S. Cl.
CPC .......... *B60Q 3/20* (2017.02); *B60H 1/00792* (2013.01); *B60H 1/00821* (2013.01);
(Continued)

(58) Field of Classification Search
CPC ........ B60H 1/00878; B60H 2001/3277; B60H 2001/3279; B60H 1/32; B60H 2001/3255;
(Continued)

(56) References Cited
U.S. PATENT DOCUMENTS 7,344,277 B2   3/2008   Anderson, Jr. et al.
8,140,344 B2   3/2012   Kameyama
(Continued)

FOREIGN PATENT DOCUMENTS

CN   101282858 A   10/2008
CN   102097229 A   6/2011
(Continued)

OTHER PUBLICATIONS

International Search Report dated Jul. 18, 2017 in related International Application No. PCT/EP2017/000452.
(Continued)

*Primary Examiner* — Ig T An
(74) *Attorney, Agent, or Firm* — Patent Portfolio Builders PLLC

(57) ABSTRACT

A method for feedback of a temperature setting of an air-conditioning device involves adjusting a light color of at least one lighting element for the display of a set temperature. The adjusted light color corresponds to a temperature setting of an airflow zone in a motor vehicle.

13 Claims, 1 Drawing Sheet

Figure 1:
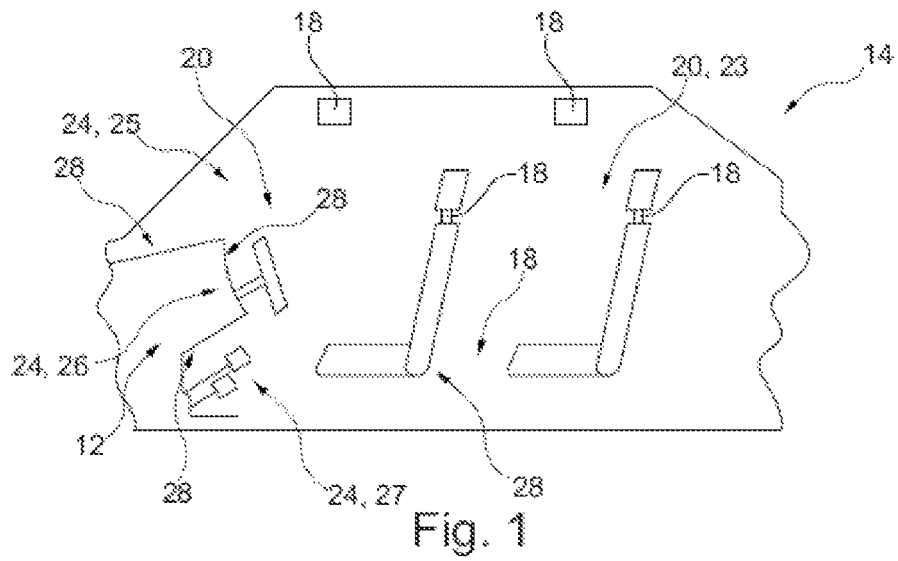

(51) Int. Cl.
  *B60K 35/00* (2006.01)
  *B60H 1/00* (2006.01)
  *B60Q 3/74* (2017.01)

(52) U.S. Cl.
  CPC ......... *B60H 1/00985* (2013.01); *B60K 35/00* (2013.01); *B60Q 3/74* (2017.02); *B60Q 3/80* (2017.02); *B60K 2370/188* (2019.05); *B60Q 2500/20* (2013.01)

(58) Field of Classification Search
  CPC ........ B60H 2001/3282; B60H 1/00021; B60H 1/00028; B60H 1/00035; B60H 1/00064; B60Q 3/85; B60Q 3/80; B60Q 3/20; B60Q 3/74
  See application file for complete search history.

(56) References Cited

U.S. PATENT DOCUMENTS

| | | | | |
|---|---|---|---|---|
| 2007/0046452 | A1* | 3/2007 | Anderson, Jr. | B60Q 3/20 340/449 |
| 2009/0093206 | A1* | 4/2009 | Okita | B60H 1/247 454/143 |
| 2016/0280039 | A1* | 9/2016 | Vanhelle | H05B 45/20 |
| 2017/0102163 | A1* | 4/2017 | Fraser | F24F 11/70 |

FOREIGN PATENT DOCUMENTS

| | | | |
|---|---|---|---|
| CN | 104709166 A | 6/2015 | |
| CN | 105416002 A | 3/2016 | |
| CN | 205185879 U | 4/2016 | |
| DE | 10138182 A1 | 3/2003 | |
| DE | 102004032105 A1 | 1/2006 | |
| DE | 102006015332 A1 | 11/2006 | |
| DE | 102006030300 * | 1/2008 | ......... B60H 1/00985 |
| DE | 102006030300 A1 | 1/2008 | |
| DE | 102007042477 A1 | 3/2009 | |
| DE | 102008012239 A1 | 9/2009 | |
| DE | 102013022338 A1 | 4/2015 | |
| FR | 2939208 A1 | 6/2010 | |
| FR | 3010016 A1 | 3/2015 | |
| JP | 2003072463 A | 3/2003 | |
| KR | 20140140278 A | 12/2014 | |
| WO | 2015192252 A1 | 12/2015 | |

OTHER PUBLICATIONS

Search Report created on Apr. 5, 2017 in related DE Application No. 10 2016 005 460.3.
Written Opinion dated Jul. 18, 2017 in related International Application No. PCT/EP2017/000452.
Office Action dated Feb. 2, 2021 in related/corresponding CN Application No. 201780027230.9.
Office Action dated Sep. 13, 2021 in related/corresponding CN Application No. 201780027230.9.

* cited by examiner

METHOD FOR FEEDBACK OF A TEMPERATURE SETTING

BACKGROUND AND SUMMARY OF THE INVENTION

Exemplary embodiments of the present invention relate to a method for feedback of a temperature setting of an air-conditioning device. Furthermore, exemplary embodiments of the present invention relate to a motor vehicle having an air-conditioning device, ambient lighting and a control unit, the motor vehicle being configured to carry out such a method.

Most motor vehicles are now equipped with air-conditioning devices which air-condition the interior of a motor vehicle. The vehicle occupants, in particular the driver of the vehicle, usually can set the desired target temperature and a ventilation level. Moreover, from which direction or from which air outlet nozzles the main airflow is to be directed can usually also been adjusted. Furthermore, known air-conditioning devices having a plurality of zones, in which different temperatures can be set. It can be seen that a plurality of setting options exists for modern air-conditioning devices. For this reason, the driver of the motor vehicle, when adjusting the air conditioning device, can easily be distracted from traffic, which represents a safety risk.

A method for regulating lighting in artificially illuminated rooms is known from DE 10 2004 032 105 B4. For this purpose, a color temperature of an essentially white interior lighting is influenced as a function of a difference between a set temperature and an actually present temperature. If the set target temperature is greater than the actual temperature, a warmer color temperature is selected, and if the set target temperature is smaller than the actual temperature, a colder color temperature is set. In such a method, on the basis of the color temperature of the white light, it can only be detected whether the air-conditioning device warms or cools the space. An absolute target temperature cannot be concluded. Moreover, only the color temperature of white light can be adjusted. Human vision is designed to compensate for changes in color temperature of white light. That means, if the eye has adjusted to a certain color temperature of white light, humans perceive this light as white. For this reason, a human can only perceive a change in color temperature. After a short period of acclimatization, a human no longer can recognize whether a warmer or a colder color temperature is set. For this reason, after a short period of time, a human also can no longer conclude whether the air-conditioning device is in a cooling or heating operation.

Furthermore, FR 2 939 208 A1 discloses a display device for use in an instrument paneling of a motor vehicle, which includes a control unit for setting different intensities of blue light and red light. Based on a variable parameter value, the blue light and the red light are respectively emitted from light emitting elements. The variable parameter value is a temperature set value of an air-conditioning system.

DE 10 2006 030 300 A1 describes a motor vehicle, including a plurality of lighting elements disposed in a distributed manner in the interior, having at least one lighting means for illuminating the interior of the vehicle. At least one portion of the lighting means are green-blue light emitting diodes, a color of the generated light being controllable as a function of a selected temperature of a heating and/or cooling device integrated on the vehicle side or of a measured interior temperature.

Furthermore, US 2009/093206 A1 describes an air-conditioning system for a vehicle. The air-conditioning system is coupled to a light color control unit, which controls a color of a light emitted by the light source as a function of the target air temperature. For this light color control unit, the emitted light in a heating air-conditioning mode is red and in a cooling air-conditioning mode is blue. If the target air temperature is increased, a portion of red color increases in the emitted light. If the target air temperature decreases, a portion of blue color increases in the emitted light so that the light emitted from the light source has a color temperature which increases with an increase in temperature.

Exemplary embodiments of the present invention are directed to an improved or at least different embodiment of a method for feedback of a temperature setting, which is, in particular, ensures noticeability of the feedback over a longer period of time.

The present invention is based on the general idea to use a colored light source to symbolize a temperature setting. Colored light can still be perceived as a color even after a long period of acclimatization by the viewer and, for this reason, even after a longer period of time, the set temperature can be concluded. According to the present invention, it is provided for this purpose that, for the display of a set temperature, a light color of at least one lighting element is adjusted. The human usually can very easily distinguish the three primary colors red, green and blue, so that in this way a good differentiation of the temperature setting is possible. Moreover, secondary colors of the primary colors can also be used to display intermediary settings in the temperature setting.

For this purpose, all lighting elements used for the display of the set temperature are assigned to at least one airflow zone of the air-conditioning device. Such airflow zones are, for example, a foot space, a center or body region, a head region, a region of the front windshield and a diffuse airflow zone. These airflow zones also are, in particular, sub-zones of the zones of the air-conditioning device. As a result, on the basis of the lighting elements for which the lighting color changes, the operator of the air conditioning device can recognize which airflow zones are active, that is, in which of the airflow zones the ventilation air is guided. In addition, the operator of the air conditioning device can recognize, in which airflow zone the temperature is set and how the temperature is set in the remaining airflow zones.

Furthermore, for all lighting elements assigned to an active airflow zone of the air-conditioning device, the light color is adjusted for the display of the set temperature. An active airflow zone is such an airflow zone, which is supplied with air by the air-conditioning device, meaning that it is ventilated with air-conditioned air, in particular fresh air or recirculated air. In so doing, it can be recognized, which airflow zone is actually active.

An advantageous possibility provides that in a warm temperature range, which is above a neutral temperature, a warm color is set, and in a cold temperature range, which is below a neutral temperature, a cool color is set. In this manner, the approximate level of the set temperature very intuitively can be symbolized to the operator of the air conditioning device.

For example, temperature settings in a warm temperature range can be symbolized by the color red. Correspondingly, temperature settings in a cold temperature range can be symbolized by the color blue. Furthermore, temperature settings in a neutral temperature range can be symbolized by the colors white or green.

In the description and the appended claims, "warm colors" are understood to be colors having a higher portion of red tones than blue tones. "Cold colors" are understood to be colors having a higher portion of blue tones than red tones.

A further advantageous possibility provides that the warm temperature range is above 22° C., in particular between 22° C. and 27° C. Most people perceive interior temperatures above 22° C. as warm. For this reason, it is advantageous that the warm temperature range is above 22° C. and, on the basis of the set warm light color of the lighting element, the warm temperature therefore is symbolized.

A particularly advantageous possibility provides that a cold temperature range is below 19° C., in particular between 16° C. and 19° C. Most people perceive interior temperatures which are below 19° C. as cold or at least as cool. For this reason, it is advantageous if temperatures below 19° C. are symbolized by a cool light color.

A further particularly advantageous possibility provides that the neutral temperature range is between 19° C. and 22° C. In this neutral temperature range a light color can be chosen which is perceived as neutral. Such light colors, for example, can include green tones or white.

An advantageous solution provides that the selection of the lighting element, in which the light color is adjusted for the display of the set temperature, indicates for which area the temperature has been set. As a result, the operator of the air-conditioning device very easily can recognize for which area he/she sets the temperature. For example, such areas can be the driver side, the passenger side or the rear compartment area in a motor vehicle. However, it is also conceivable, for example, to be able to set different temperatures for the foot space or the head space.

A further advantageous solution provides that the air-conditioning device has at least two zones, in which a temperature can be independently set, and that in each zone, for the display of the temperature set in a respective zone, the light color is adjusted for at least one lighting element. In this way, the operator of the air-conditioning device can quickly and easily recognize, how the temperatures are set for the respective zones.

A further advantageous variant provides that for all lighting elements to which no active airflow zone of the air-conditioning device is assigned, a neutral light color is set and/or the brightness is lowered, or that all lighting elements to which no active airflow zone of the air-conditioning device is assigned are turned off. As a result, it can be recognized on the basis of the respective lighting element, which airflow zone is active. It is also conceivable that the brightness of the lighting element indicates at which level the ventilation in the respective airflow zone is set.

Expediently, for the display of the set temperature, the light color of a lighting element situated at an air outlet opening, out of which air flows, is adjusted. In so doing, the operator of the air-conditioning device can recognize exactly from which direction the air, the temperature of which he/she just set, flows into the interior. As a result, the operator of the air-conditioning device is enabled to make an individual demand-oriented adjustment of the air-conditioning device without generating too great of a distraction.

A further advantageous possibility provides that, for the display of the set temperature, the light color of a lighting element that is part of an ambient lighting is adjusted. Such an ambient lighting could also be called surrounding lighting or mood lighting. Ambient lighting primarily serves to set accents, for example, to illuminate specific components in a targeted manner. In this way, the zone or airflow zone which is active can even more easily be indicated.

An advantageous variant provides that, for the display of the set temperature, at least one lighting element is used which has a plurality; for example three, light emitting diodes, at least one of the light emitting diodes emits red light, at least one of the light emitting diodes emits blue light and at least one of the light emitting diodes emits green light. The light emitting diodes, for example, can be configured as semiconductor crystal based light emitting diodes or as organic light emitting diodes (OLED).

Alternatively, or in addition, it can be provided for this purpose to use white light sources which are provided with a color filter, so that they emit respectively red, blue and green light.

Furthermore, the present invention is based on the general idea to configure a motor vehicle, having an air conditioning device, an ambient lighting and a control unit, in such a manner that a method according to the previous description is carried out. In this way, the advantages of the method are transferred to the motor vehicle, to the previous description of which is made reference to in this respect.

An advantageous solution provides that a control unit, which is configured to control the ambient lighting and which does control this ambient lighting, is connected to a bus system on the vehicle side, in particular a CAN bus system, so that the control unit can read out control commands from an operating element of the air-conditioning device and correspondingly can adjust a light color of one or a plurality of lighting elements of the ambient lighting.

An advantageous variant provides that the least one lighting element has a plurality; for example three, light emitting diodes, at least one of the light emitting diodes emits red light, at least one of the light emitting diodes emits blue light and at least one of the light emitting diodes emits green light. The light emitting diodes, for example, can be configured as semiconductor crystal based light emitting diodes or as organic light emitting diodes (OLED).

Alternatively, or in addition, for this purpose it can be provided to use white light sources which are provided with a color filter, so that they emit respectively red, blue and green light.

A further advantageous variant provides that the brightness of the red, the blue and the green light emitting diodes can be set independently from one another. For this purpose, a light emitting diode driver device is provided, which is configured to supply electric power to the light emitting diodes which are assigned to the individual light colors.

Further important features and advantages of the present invention result from the drawing and the associated description of the figures based on the drawing.

It is understood that the previously mentioned and subsequently still to be described features not only may be used in the respectively specified combination but also in other combinations or may be used standing on their own without leaving the scope of the present invention.

Preferred exemplary embodiments of the present invention are illustrated in the drawing and are explained in greater detail in the subsequent description, the same reference characters referring to the same or functionally equivalent components.

BRIEF DESCRIPTION OF THE DRAWING FIGURES

In the figures, respectively schematically

Figure 2:
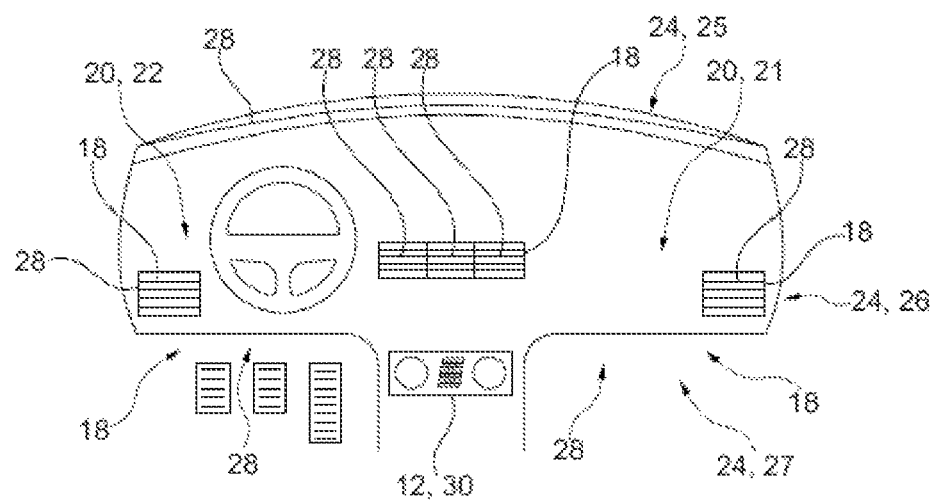
Figure 3:
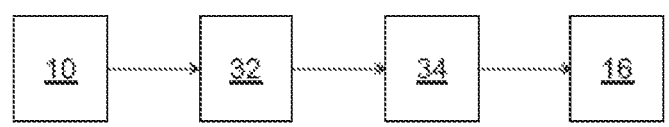

FIG. 1. shows a longitudinal section through a motor vehicle;

FIG. 2 shows a frontal view onto a dashboard area of a motor vehicle from FIG. 1; and FIG. 3 shows a flowchart of the method according to the present invention.

DETAILED DESCRIPTION

A motor vehicle 14 shown in FIGS. 1 and 2 has an air-conditioning device 12, having at least one control unit 30 and a plurality of air outlet openings 28. A temperature setting 10 can be carried out at control unit 30. For the display 16 of temperature setting 10, the light color is changed at lighting elements 18, for example, of an ambient lighting.

After a temperature setting 10 has taken place, for example by an operator, in particular the vehicle driver, a determination 32 of the light color is carried out, which is to be set at lighting elements 18.

Preferably, a warm light color is selected if the set temperature is in a warm temperature range, which is above a neutral temperature or a neutral temperature range. Accordingly, preferably a cool light color is selected if the set temperature is in a cold temperature range, which is below a neutral temperature or a neutral temperature range.

For example, the set temperatures are in the warm temperature range if they are above 22° C., in particular between 22° C. and 27° C., and in the cold temperature range if they are below 19° C., in particular between 16° C. and 19° C. The neutral temperature range, for example, ranges between 19° C. and 22° C.

If air-conditioning device 12 has more than one zone 20 or airflow zone 24, it can be provided that by a selection 34 of lighting element 18, in which the light color is changed for a display 16 of temperature setting 10, it is indicated for which zone 20 or airflow zone 24 the temperature setting is effective.

Such zones 20 are characterized by the fact that respectively one individual independent temperature can be set in zones 20. Such zones 20, for example, are a passenger zone 21, a driver zone 22 and a rear compartment zone 23.

Such airflow zones 24, for example, can be a front windshield zone or head zone 25, a center zone 26 and a foot zone 27. It is also conceivable that the color intensity or brightness of lighting elements 18 indicates at which level the ventilation is set in respective airflow zone 24.

Lighting elements 18 are assigned to a zone 20 and, preferably, also to an airflow zone 24. For this purpose, the allocation is carried out in such a manner that lighting elements 18 are assigned to zone 20 or airflow zone 24, in which lighting elements 18 are located.

Such lighting elements 18 can be part of an ambient lighting. For example, such lighting elements 18 are situated at air outlet openings 28. Lighting elements 18 may however also be disposed to set accents and, thus, to achieve a lighting mood in the interior of motor vehicle 14.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

What is claimed is:

1. A method for feedback of a temperature setting of an air-conditioning device, which has a plurality of airflow zones, in a motor vehicle, the method comprising:
    determining which of the plurality of airflow zones is an active airflow zone, wherein the motor vehicle includes a plurality of lighting elements, each of the plurality of lighting elements is assigned to one of the plurality of airflow zones, wherein the airflow zones are subzones of zones of the air-conditioning device, wherein a temperature can be set individually and independently for each of the zones of the air-conditioning device, and wherein additional lighting elements are respectively assigned to each of the zones of the air-conditioning device;
    determining a temperature set for each of the active airflow zones; and
    adjusting a light color of each lighting element assigned to each of the active airflow zones and of each additional lighting element assigned to the zones of the air-conditioning device to a light color corresponding to the temperature set for the active airflow zone assigned to the lighting element and to the temperature set for the zones of the air-conditioning device assigned to the additional lighting element, respectively.

2. The method of claim 1, wherein
    the light color corresponding to the temperature set for one of the active airflow zones is a warm color when the temperature set for the one of the active airflow zones is in a warm temperature range that is above a neutral temperature, and
    the light color corresponding to the temperature set for one of the active airflow zones is a cool color when the temperature set for one of the active airflow zones is in a cool temperature range that is below the neutral temperature.

3. The method of claim 2, wherein
    the warm temperature range is between 22° C. and 27° C.,
    the cold temperature range is between 16° C. and 19° C., or
    a neutral temperature range is between 19° C. and 22° C.

4. The method of claim 1, wherein
    the lighting elements for which a light color is adjusted indicates for which area of the motor vehicle the temperature has been set.

5. The method of claim 1, wherein for
    all lighting elements not assigned to an active airflow zone, a neutral light color is set or a brightness is lowered, or
    all lighting elements not assigned to an active airflow zone are turned off.

6. The method of claim 1, wherein
    each of the plurality of lighting elements is situated at an air outlet opening, out of which air flows, is adjusted, or
    each of the plurality of light elements is an ambient lighting element.

7. The method of claim 1, wherein each lighting element assigned to one of the plurality of airflow zones comprises three different colored lighting elements.

8. The method of claim 1, wherein each lighting element assigned to one of the plurality of airflow zones comprises a color filter.

9. A motor vehicle, comprising:
- an air-conditioning device having a plurality of airflow zones, wherein the airflow zones are subzones of zones of the air-conditioning device, wherein a temperature can be set individually and independently for each of the zones of the air-conditioning device;
- a plurality of lighting elements, each of which is respectively assigned to one of the plurality of airflow zones;
- a plurality of additional lighting units, each of which is respectively assigned to one of a plurality of zones of the air-conditioning device; and
- a controller coupled to the air-conditioning device and the plurality of lighting elements, wherein the controller is configured to
  - determine which of the plurality of airflow zones is an active airflow zone;
  - determine a temperature set for each of the active airflow zones; and
  - adjust a light color of each lighting element assigned to each of the active airflow zones and of each additional lighting element assigned to the zones of the air-conditioning device to a light color corresponding to the temperature set for the active airflow zone assigned to the lighting element is assigned and to the temperature set for the zones of the air-conditioning device assigned to the additional lighting element, respectively.

10. The method of claim 1, wherein the zones of the air-conditioning system comprise a driver zone, a front passenger zone, and a rear compartment zone.

11. The method of claim 10, wherein the airflow zones comprise a front windshield or head zone, a center zone, and a foot zone.

12. The motor vehicle of claim 9, wherein the zones of the air-conditioning system comprise a driver zone, a front passenger zone, and a rear compartment zone.

13. The motor vehicle of claim 12, wherein the airflow zones comprise a front windshield or head zone, a center zone, and a foot zone.

* * * * *